(12) United States Patent
Zhang et al.

(10) Patent No.: US 11,597,408 B2
(45) Date of Patent: Mar. 7, 2023

(54) VEHICLE CONTROL SYSTEM

(71) Applicant: Aptiv Technologies Limited, St. Michael (BB)

(72) Inventors: Guoguang Zhang, Kokomo, IN (US); Tanto Sugiarto, West Lafayette, IN (US); Qian Wang, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 194 days.

(21) Appl. No.: 16/924,638

(22) Filed: Jul. 9, 2020

(65) Prior Publication Data
US 2022/0009522 A1 Jan. 13, 2022

(51) Int. Cl.
*B60W 60/00* (2020.01)
*B60W 30/09* (2012.01)
*B60W 30/095* (2012.01)

(52) U.S. Cl.
CPC ........ *B60W 60/0051* (2020.02); *B60W 30/09* (2013.01); *B60W 30/095* (2013.01); *B60W 2420/42* (2013.01); *B60W 2420/52* (2013.01); *B60W 2510/20* (2013.01); *B60W 2520/125* (2013.01); *B60W 2552/30* (2020.02)

(58) Field of Classification Search
CPC ............. B60W 60/0051; B60W 30/09; B60W 30/095; B60W 2420/42; B60W 2420/52; B60W 2510/20; B60W 2520/125; B60W 2552/30; B60W 2510/202; B60W 2510/205; B60W 2540/18; B60W 2710/207; B60W 30/12; B60W 60/0055; B60W 60/0059; B60W 60/0054
See application file for complete search history.

(56) References Cited

U.S. PATENT DOCUMENTS

| 7,019,623 B2 | 3/2006 | Klausner et al. |
| 9,493,118 B1 | 11/2016 | Laur et al. |
| 9,637,120 B2 | 5/2017 | Laur et al. |
| 9,727,056 B2 | 8/2017 | Laur et al. |

(Continued)

FOREIGN PATENT DOCUMENTS

| DE | 102014225680 A1 | 6/2016 |
| DE | 102018001970 A1 | 9/2019 |

(Continued)

OTHER PUBLICATIONS

"Extended European Search Report", EP Application No. 21179832.7, dated Oct. 11, 2021, 9 pages.

(Continued)

*Primary Examiner* — Jason Holloway
(74) *Attorney, Agent, or Firm* — Sawtooth Patent Group PLLC

(57) ABSTRACT

A vehicle control system includes a controller circuit in communication with a steering sensor and one or more perception sensors. The steering sensor is configured to detect a steering torque of a steering wheel of a host vehicle. The one or more perception sensors are configured to detect an environment proximate the host vehicle. The controller circuit is configured to determine when an operator of the host vehicle requests a take-over from fully automated control of the host vehicle based on the steering sensor. The controller circuit classifies the take-over request based on the steering sensor.

25 Claims, 9 Drawing Sheets

(56) References Cited

U.S. PATENT DOCUMENTS

| | | | |
|---|---|---|---|
| 10,007,264 B2 | 6/2018 | Zhu et al. | |
| 10,227,073 B2* | 3/2019 | Urano | G05D 1/0061 |
| 11,094,080 B2 | 8/2021 | Schiebener et al. | |
| 2006/0285723 A1 | 12/2006 | Morellas et al. | |
| 2011/0133919 A1 | 6/2011 | Evarts et al. | |
| 2012/0283894 A1 | 11/2012 | Naboulsi | |
| 2016/0207537 A1* | 7/2016 | Urano | B62D 1/286 |
| 2016/0209841 A1 | 7/2016 | Yamaoka et al. | |
| 2016/0280235 A1* | 9/2016 | Sugaiwa | G05D 1/0088 |
| 2016/0357185 A1 | 12/2016 | Laur et al. | |
| 2016/0378114 A1* | 12/2016 | Laur | B60W 60/0053 |
| | | | 701/23 |
| 2017/0057353 A1 | 3/2017 | Griffin | |
| 2017/0304732 A1 | 10/2017 | Velic et al. | |
| 2017/0327149 A1* | 11/2017 | Schneider | B60W 10/20 |
| 2018/0046255 A1 | 2/2018 | Rothera et al. | |
| 2018/0365533 A1 | 12/2018 | Sathyanarayana et al. | |
| 2019/0092346 A1 | 3/2019 | Odate et al. | |
| 2019/0187701 A1 | 6/2019 | Zheng et al. | |
| 2019/0299996 A1 | 10/2019 | Stübing et al. | |
| 2020/0001882 A1 | 1/2020 | Wulf | |
| 2020/0039584 A1* | 2/2020 | Igarashi | B60W 30/18163 |
| 2020/0231109 A1 | 7/2020 | Baltaxe et al. | |
| 2020/0239007 A1 | 7/2020 | Sobhany | |
| 2020/0320737 A1 | 10/2020 | Schiebener et al. | |

FOREIGN PATENT DOCUMENTS

| | | |
|---|---|---|
| EP | 3072770 | 9/2016 |
| JP | 2017068424 A | 4/2017 |
| WO | 2018113857 A1 | 6/2018 |

OTHER PUBLICATIONS

"Extended European Search Report", EP Application No. 19167436.5, dated Oct. 10, 2019, 11 pages.

"Extended European Search Report", EP Application No. 19197824.6, dated Apr. 2, 2020, 8 pages.

"Foreign Office Action", EP Application No. 19167436.5, dated Jul. 8, 2021, 7 pages.

Amortila, et al., "Positioning Study of Driver's Hands in Certain Areas of the Steering Wheel", Jan. 2018, 6 pages.

Borghi, et al., "Hands on the wheel: A Dataset for Driver Hand Detection and Tracking", May 2018, 8 pages.

Cheng, et al., "Multi-spectral and multi-perspective video arrays for driver body tracking and activity analysis", Aug. 2006, 13 pages.

Cucchiara, et al., "Camera-car Video Analysis for Steering Wheel's Tracking", Apr. 2003, pp. 36-43.

Le, "Multiple Scale Faster-RCNN Approach to Driver's Cell-Phone Usage and Hands on Steering Wheel Detection", Jun. 2016, pp. 46-53.

Le, et al., "Robust Hand Detection and Classification in Vehicles and in the Wild", Jul. 2017, pp. 39-46.

Le, et al., "Robust Hand Detection in Vehicles", Dec. 2016, pp. 562-567.

Rangesh, et al., "Driver hand localization and grasp analysis: A vision-based real-time approach", Nov. 2016, 6 pages.

Tran, et al., "Driver assistance for Keeping Hands on the Wheel and Eyes on the Road", Dec. 2009, 6 pages.

Zhou, et al., "Hierarchical Context-Aware Hand Detection Algorithm for Naturalistic Driving", Nov. 2016, 6 pages.

"Foreign Office Action", EP Application No. 21179832.7, dated Nov. 25, 2022, 4 pages.

* cited by examiner

VEHICLE CONTROL SYSTEM

TECHNICAL FIELD OF DISCLOSURE

This disclosure generally relates to a control system for a vehicle.

BACKGROUND OF THE DISCLOSURE

A driver take-over from automated driving to manual driving may create instability in the steering of a vehicle.

SUMMARY OF THE DISCLOSURE

When a driver assumes control of an autonomously driven vehicle and places their hands on a steering wheel, the driver's steering reaction during the take-over transition may be excessive for the environment in which the vehicle is operating. Such steering reactions may cause the vehicle to deviate from, or within, a travel lane unnecessarily, until the driver is in full control of the vehicle. This disclosure describes a vehicle control system that classifies the driver's take-over, based on inputs to the steering wheel, and determines a level of driver assistance during the transition from automated to manual driving, based on the context of the environment around the vehicle.

An example of a vehicle control system, includes a controller circuit in communication with a steering sensor and one or more perception sensors. The steering sensor is configured to detect a steering torque of a steering wheel of a host vehicle. The one or more perception sensors are configured to detect an environment proximate the host vehicle. The controller circuit is configured to determine when an operator of the host vehicle requests a take-over from fully automated control of the host vehicle based on the steering sensor, wherein the controller circuit classifies the take-over request based on the steering sensor.

In an example having one or more features of the vehicle control system of the previous paragraph, the controller circuit determines a level of automated driver assistance based on the steering sensor and the environment.

In an example having one or more features of the vehicle control system of any of the previous paragraphs, the controller circuit determines that the operator requests the take-over when the steering torque is greater than a first threshold.

In an example having one or more features of the vehicle control system of any of the previous paragraphs, the one or more perception sensors include one of a camera, a RADAR, a LiDAR, and an inertial measurement unit.

In an example having one or more features of the vehicle control system of any of the previous paragraphs, wherein the steering sensor is further configured to detect a steering angle and a steering angle rate.

In an example having one or more features of the vehicle control system of the previous paragraph, the controller circuit classifies a first take-over when, a maximum steering angle is less than a second threshold, a maximum steering angle rate is greater than a third threshold and less than a fourth threshold.

In an example having one or more features of the vehicle control system of any of the previous paragraphs, the controller circuit classifies a second take-over when, a maximum steering angle is less than a second threshold, and a maximum steering angle rate is less than a third threshold.

In an example having one or more features of the vehicle control system of any of the previous paragraphs, the controller circuit classifies a third take-over when, a maximum steering angle is greater than a fifth threshold, and a maximum steering angle rate is greater than a fourth threshold.

In an example having one or more features of the vehicle control system of any of the previous paragraphs, the controller circuit determines the level of automated driver assistance based on the classification of the take-over request and the one or more perception sensors.

In an example having one or more features of the vehicle control system of the previous paragraph, when the controller circuit classifies a first take-over and no obstacle is detected by the one or more perception sensors, the controller circuit disables the automated driver assistance.

In an example having one or more features of the vehicle control system of any of the previous paragraphs, when the controller circuit classifies a second take-over and at least one obstacle is detected by the one or more perception sensors, the controller circuit enables the automated driver assistance to avoid a collision with the at least one obstacle.

In an example having one or more features of the vehicle control system of any of the previous paragraphs, when the controller circuit classifies a third take-over and at least one obstacle is detected by the one or more perception sensors, the controller circuit enables the automated driver assistance to avoid a collision with the at least one obstacle.

In an example having one or more features of the vehicle control system of any of the previous paragraphs, when the controller circuit further determines the level of automated driver assistance based on a radius of curvature of a roadway.

In an example having one or more features of the vehicle control system of any of the previous paragraphs, when the controller circuit further determines the level of automated driver assistance based on a lateral acceleration of the host vehicle.

An example of a method of operating a vehicle control system includes detecting a steering torque of a steering wheel of a host vehicle with a steering sensor, detecting an environment proximate the host vehicle with one or more perception sensors, determining, with a controller circuit in communication with the steering sensor and the one or more perception sensors, when an operator of the host vehicle requests a take-over from fully automated control of the host vehicle based on the steering sensor, and classifying, with the controller circuit, the take-over request based on the steering sensor.

In an example having one or more features of the method of operating the vehicle control system of the previous paragraph, the controller circuit determines a level of automated driver assistance based on the steering sensor and the environment.

In an example having one or more features of the method of operating the vehicle control system of any of the previous paragraphs, the controller circuit determines that the operator requests the take-over when the steering torque is greater than a first threshold.

In an example having one or more features of the method of operating the vehicle control system of any of the previous paragraphs, the one or more perception sensors include one of a camera, a RADAR, a LiDAR, and an inertial measurement unit.

In an example having one or more features of the method of operating the vehicle control system of any of the previous paragraphs, the steering sensor is further configured to detect a steering angle and a steering angle rate.

In an example having one or more features of the method of operating the vehicle control system of the previous paragraph, the controller circuit classifies a first take-over when, a maximum steering angle is less than a second threshold, and a maximum steering angle rate is greater than a third threshold and less than a fourth threshold.

In an example having one or more features of the method of operating the vehicle control system of any of the previous paragraphs, the controller circuit classifies a second take-over when, a maximum steering angle is less than a second threshold, and a maximum steering angle rate is less than a third threshold.

In an example having one or more features of the method of operating the vehicle control system of any of the previous paragraphs, the controller circuit classifies a third take-over when, a maximum steering angle is greater than a fifth threshold, and a maximum steering angle rate is greater than a fourth threshold.

In an example having one or more features of the method of operating the vehicle control system of any of the previous paragraphs, the controller circuit determines the level of automated driver assistance based on the classification of the take-over request and the one or more perception sensors.

In an example having one or more features of the method of operating the vehicle control system of the previous paragraph, the controller circuit classifies a first take-over and no obstacle is detected by the one or more perception sensors, the controller circuit disables the automated driver assistance.

In an example having one or more features of the method of operating the vehicle control system of any of the previous paragraphs, the controller circuit classifies a second take-over and at least one obstacle is detected by the one or more perception sensors, the controller circuit enables the automated driver assistance to avoid a collision with the at least one obstacle.

In an example having one or more features of the method of operating the vehicle control system of any of the previous paragraphs, when the controller circuit classifies a third take-over and at least one obstacle is detected by the one or more perception sensors, the controller circuit enables the automated driver assistance to avoid a collision with the at least one obstacle.

In an example having one or more features of the method of operating the vehicle control system of any of the previous paragraphs, when the controller circuit further determines the level of automated driver assistance based on a radius of curvature of a roadway.

In an example having one or more features of the method of operating the vehicle control system of any of the previous paragraphs, when the controller circuit further determines the level of automated driver assistance based on a lateral acceleration of the host vehicle.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

This disclosure describes a vehicle control system configured to classify a type of operator take-over, after which the system provides an appropriate level of driver assistance during the transition from automated to manual driving. The vehicle control system described in this disclosure is in contrast to other systems that merely hand-over control to the driver with no transition period for driver assistance. The vehicle control system accomplishes this by inferring an urgency of the take-over based on the driver's input to the steering wheel (i.e., steering torque, steering angle, and steering angle rate), then verifying the urgency of the take-over based on sensors (e.g., RADAR, LiDAR, cameras, relative movement) that detect the surrounding environment. The driver assistance enabled during the take-over transition allows for the vehicle to maintain stability and avoid collisions with other objects or obstacles.

Figure 1:
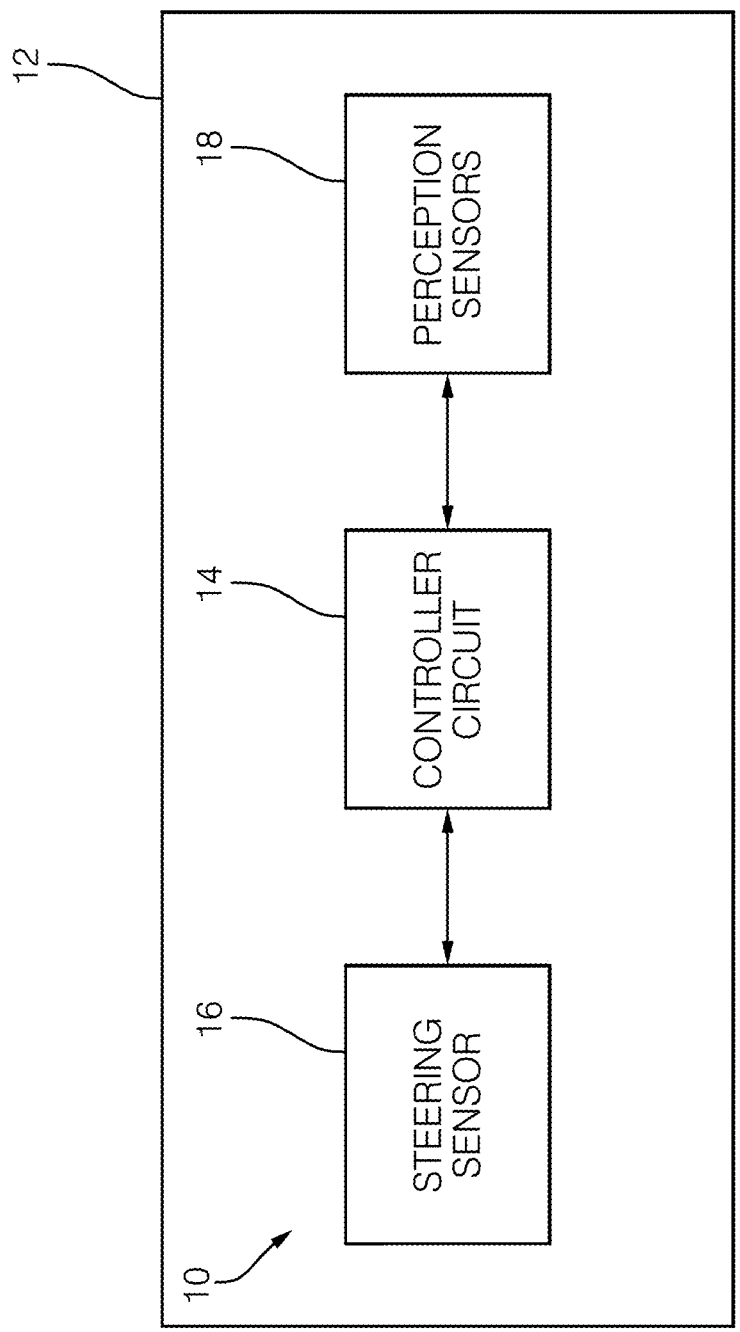
FIG. 1 is an illustration of vehicle control system in accordance with one example.

FIG. 1 illustrates an example of a vehicle control system 10, hereafter referred to as the system 10, installed on a host vehicle 12. The host vehicle 12 may be characterized as an automated vehicle. As used herein, the term automated vehicle may apply to instances when the host vehicle 12 is being operated in an automated driving mode, i.e. a fully autonomous driving mode, where the operator of the host vehicle 12 may do little more than designate a destination to operate the host vehicle 12. The host vehicle 12 may also be operated in a manual driving mode where the degree or level of automation may be little more than providing an audible or visual warning to the human operator who is generally in control of the steering, accelerator, and brakes of the host vehicle 12. For example, the system may merely assist the operator as needed to change lanes and/or avoid interference with and/or a collision with, an object such as another vehicle, a pedestrian, or a road sign. The manual driving mode may include driver assistance features, such as lane keeping, cruise control, collision avoidance, and parking assistance.

The system 10 includes a controller circuit 14 in communication with a steering sensor 16 and one or more perception sensors 18. The controller circuit 14 may be integrated with and share a memory and/or other components with other vehicle control devices (not shown), or may be a stand-alone device. The controller circuit 14 may include a processor (not shown) such as a microprocessor or other control circuitry such as analog and/or digital control circuitry. The control circuitry may include one or more application-specific integrated circuits (ASICs) or field programmable gate arrays (FPGAs) that are programmed to perform the techniques, or may include one or more general purpose hardware processors programmed to perform the techniques pursuant to program instructions in firmware, memory, other storage, or a combination. The controller circuit 14 may also combine custom hard-wired logic, ASICs, or FPGAs with custom programming to accomplish the techniques. The controller circuit 14 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The controller circuit 14 may include other examples of non-volatile memory, such as flash memory, read-only memory (ROM), programmable read-only memory (PROM), and erasable programmable read-only memory (EPROM). The controller circuit 14 may include volatile memory, such as dynamic random-access memory (DRAM), static random-access memory (SRAM). The one or more routines may be executed by the processor to perform steps for controlling the host vehicle 12, based on signals received by the controller circuit 14 from the steering sensor 16 and the one or more perception sensors 18 as described herein.

Figure 2:
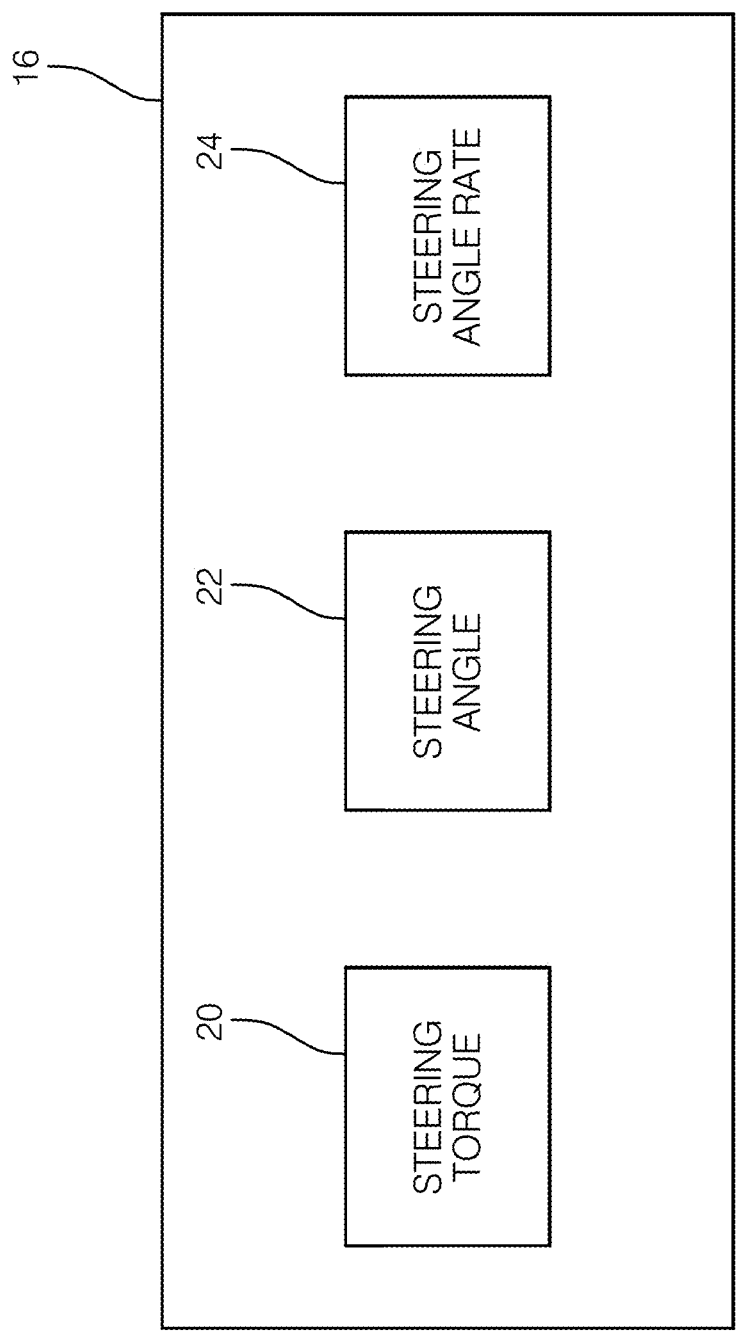
FIG. 2 is an illustration of a steering sensor of the vehicle control system of FIG. 1 in accordance with one example.

FIG. 2 illustrates an example of the steering sensor 16 isolated from the system 10. In this example, the steering sensor 16 is configured to detect a steering torque 20, a steering angle 22, and a steering angle rate 24 of the steering wheel of the host vehicle 12. In an example, the steering sensor 16 is mounted to a steering column of the host vehicle 12 and communicates with the controller circuit 14 via a controller area network bus (CAN bus—not shown). In an example, the steering sensor 16 is comprised of multiple sensors mounted in different positions on the steering column that provide individual output signals of the steering torque 20, the steering angle 22, and the steering angle rate 24 to the controller circuit 14. In another example, the steering sensor 16 is a single sensor that provides multiple output signals of the steering torque 20, the steering angle 22, and the steering angle rate 24 to the controller circuit 14.

Figure 3:
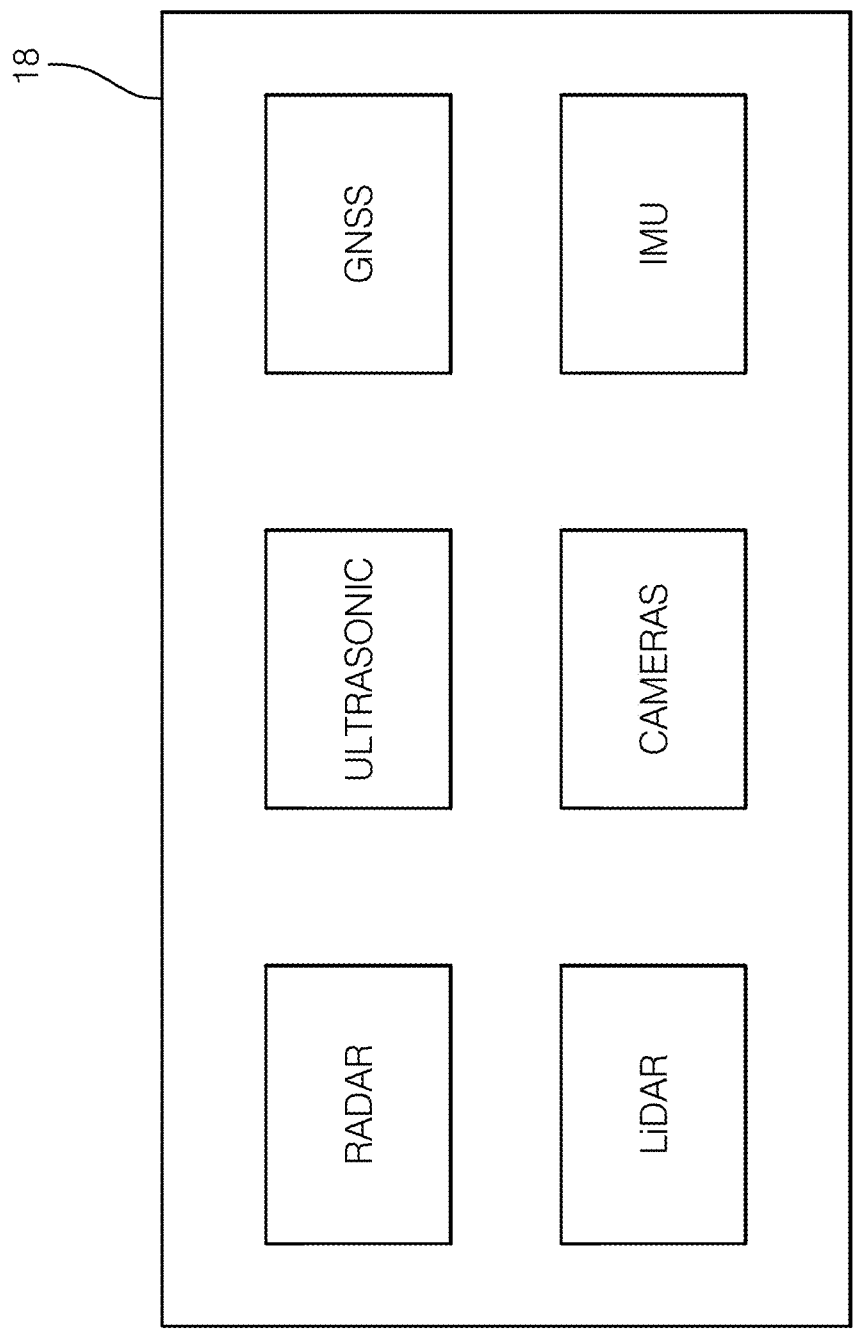
FIG. 3 is an illustration of one or more perception sensors of the vehicle control system of FIG. 1 in accordance with one example.

FIG. 3 illustrates an example of the one or more perception sensors 18 isolated from the system 10. The one or more perception sensors 18 may include ranging sensors, such as RADAR, light detection and ranging (LiDAR), and ultrasonic sensors (not shown). The one or more perception sensors 18 may also include vision sensors such as cameras, including video cameras, time of flight (TOF) camera, etc. The cameras may be mounted on the front, rear, and sides of the host vehicle 12, or mounted in the interior of the host vehicle 12 at a location suitable for the camera to view the area around the host-vehicle 12 through the windows of the host vehicle 12. The cameras are preferably video type cameras that can capture images of the roadway and surrounding area at a sufficient frame-rate, of at least ten frames per second, for example. The one or more perception sensors 18 may also include an inertial measurement unit (IMU) that detects relative movement of the host vehicle 12. The relative movement measured by the IMU may include the host vehicle's 12 current yaw rate, longitudinal acceleration, lateral acceleration, pitch rate, and roll rate. The one or more perception sensors 18 may also include a global navigation satellite system (GNSS) receiver. The GNSS receiver may receive signals from orbiting satellites from any of the known satellite systems, including Global Positioning System (GPS), Globalnaya Navigazionnaya Sputnikovaya Sistema (GLONASS), BeiDou Navigation Satellite System (BDS), and Galileo global navigation satellite system. The one or more perception sensors 18 may be distributed around the host vehicle 12 and provide a 360 degree view of the environment in which the host vehicle 12 is operating, and are configured to detect the environment proximate the host vehicle 12. In an example, the ranging sensors are used for detecting ranges and closing rates to objects and/or obstacles proximate the host vehicle 12. In an example, the cameras are used to detect and classify the objects and/or obstacles, such as lane markings, roadway edges, pedestrians, other vehicles, etc. In some examples, data from the one or more perception sensors 18 are fused to associate detections from the ranging sensors with the classifications from the cameras.

Figure 4:
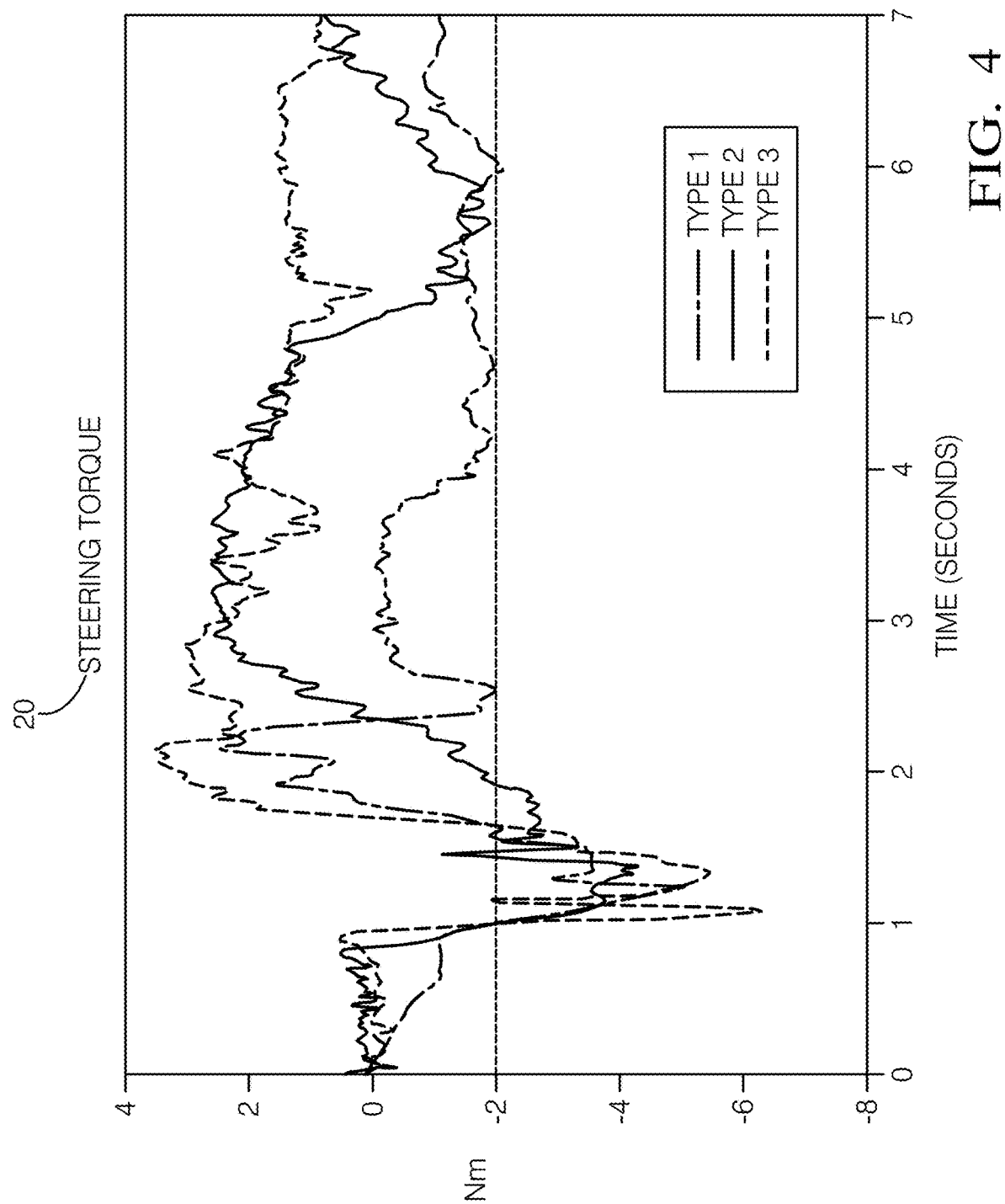
FIG. 4 is a graph of steering torque in accordance with one example.

The controller circuit 14 is configured to determine when an operator of the host vehicle 12 requests a take-over from fully automated control of the host vehicle 12 based on the steering sensor 16, and further classifies the take-over request based on the output from the steering sensor 16. In an example, the steering sensor 16 detects when the operator places one or more hands on the steering wheel by measuring a change in the steering torque 20. FIG. 4 illustrates a graph of the steering torque 20 as a function of time. Data is plotted for three classifications of operator take-over request (i.e., Type I, II, and III), that will be described in more detail below. While three classifications of operator take-over request are described in this disclosure, it will be appreciated that any number of take-over requests may be indicated using the system 10 described herein. The number of classifications may be increased or decreased based on the granularity desired by the user, and/or based on the resolution of the steering sensor 16. Referring to FIG. 4, at time equals zero (t=0), the steering torque 20 is essentially zero and indicative of the vehicle being steered in the autonomous mode where the operator's hands are not touching the steering wheel. As the time increases, the three plots indicate a change in the steering torque 20 that is substantially non-zero. In the example illustrated in FIG. 4, the controller circuit 14 determines that the operator requests the take-over when the steering torque 20 is greater than a first threshold, illustrated by a dashed line positioned at −2 Nm of steering torque 20. The first threshold may be user defined, and in this example is indicated as −2 Nm, which provides a sufficient trade-off between true and false operator take-over requests. It will be appreciated that the threshold may also be set to include +2 Nm, as the steering torque 20 is detected for both clockwise and counter-clockwise rotations of the steering wheel. In another example, an absolute value of the steering torque 20 is used for the first threshold. In another example, the controller circuit 14 determines that the operator requests the take-over when the steering torque 20 is greater than the first threshold for a defined period of time. In this example, the controller circuit 14 may reduce false or erroneous requests for operator take-over, such as when an operator inadvertently moves the steering wheel. The defined period of time may be user defined and, in an example, is in a range from between zero to one second.

Figures 5, 6:
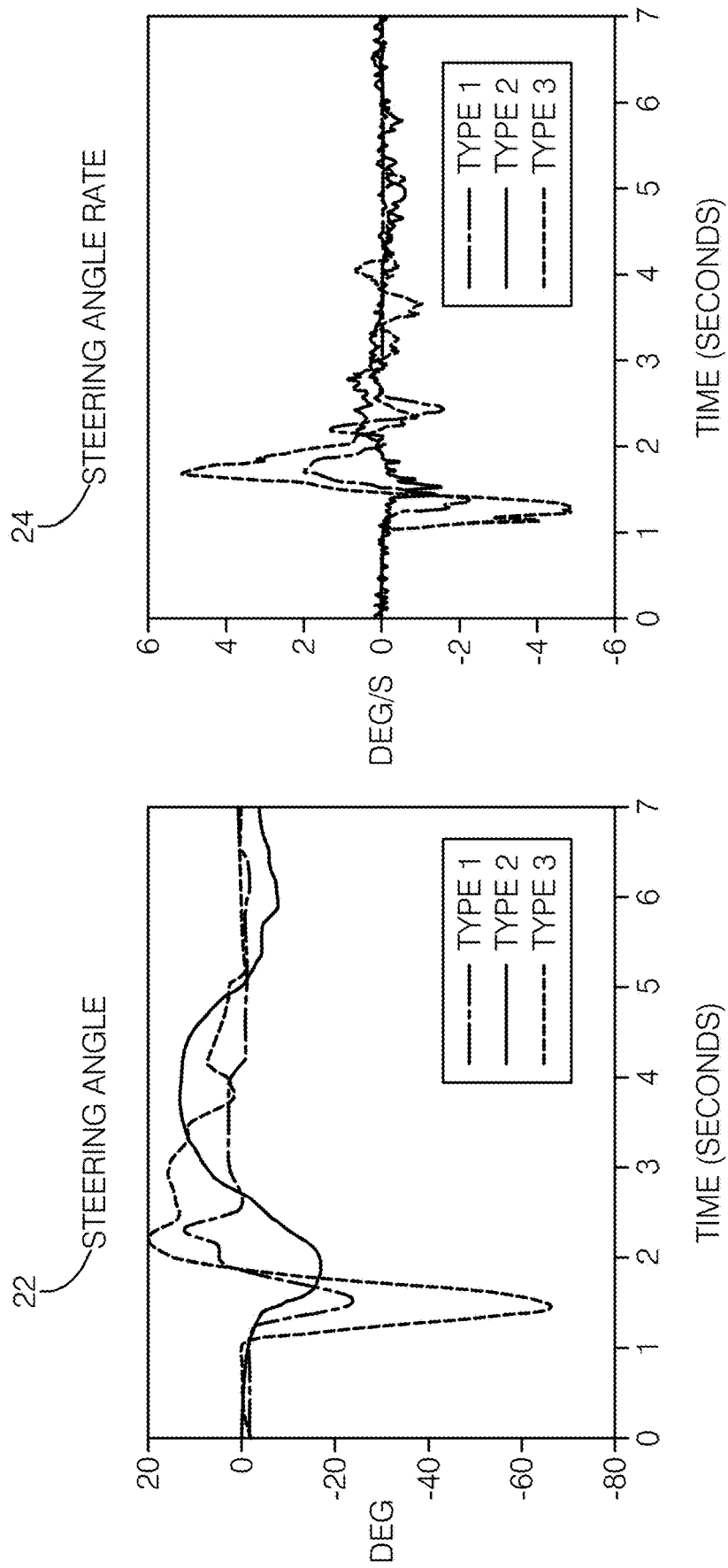
FIG. 5 is a graph of steering angle in accordance with one example.
FIG. 6 is a graph of steering torque in accordance with one example.

FIGS. 5 and 6 are graphs of the steering angle 22 and the steering angle rate 24 as a function of time for the three classifications of operator take-over request, and correspond to the graph of steering torque 20 illustrated in FIG. 4. As can be seen from FIGS. 5 and 6, the three classifications of operator take-over request indicate detectably different plots of steering angle 22 and steering angle rate 24. These detectable differences are used by the controller circuit 14 to determine whether the classification is a Type I, a Type II, or a Type III take-over request by comparing the steering angle 22 and steering angle rate 24 to respective thresholds. In the example illustrated in FIGS. 5 and 6, the controller circuit 14 classifies a first take-over (i.e., Type I) that is indicated by relatively small steering angles 22 and relatively rapid steering angle rates 24, such as when the operator turns or shakes the steering wheel in a random manner. The Type I take-over may be indicative of the operator resuming control of the host vehicle 12 in non-emergency situations, and/or when no obstacle is in the path of the host vehicle 12. In this example, the controller circuit 14 classifies the Type I take-over when a maximum steering angle 22 is less than a second threshold (e.g., 25 degrees), and when a maximum steering angle rate 24 is greater than a third threshold (e.g., 1.5 degrees/second) but less than a fourth threshold (e.g., 3 degrees/second).

In the example illustrated in FIGS. 5 and 6, the controller circuit 14 classifies a second take-over (i.e., Type II) that is indicated by relatively small steering angles 22 and relatively slow steering angle rates 24, such as when the operator exerts a relatively mild or soft persistent turn or rotation on the steering wheel. The Type II take-over may be indicative of the operator resuming control of the host vehicle 12 when in-lane biasing of the host vehicle 12 may be required to avoid an obstacle is in the path of the host vehicle 12, such as a pothole or debris. In this example, the controller circuit 14 classifies the Type II take-over when the maximum steering angle 22 is less than the second threshold (e.g., 25 degrees), and the maximum steering angle rate 24 is less than a third threshold (e.g., 1.5 degrees/second).

Figure 7:
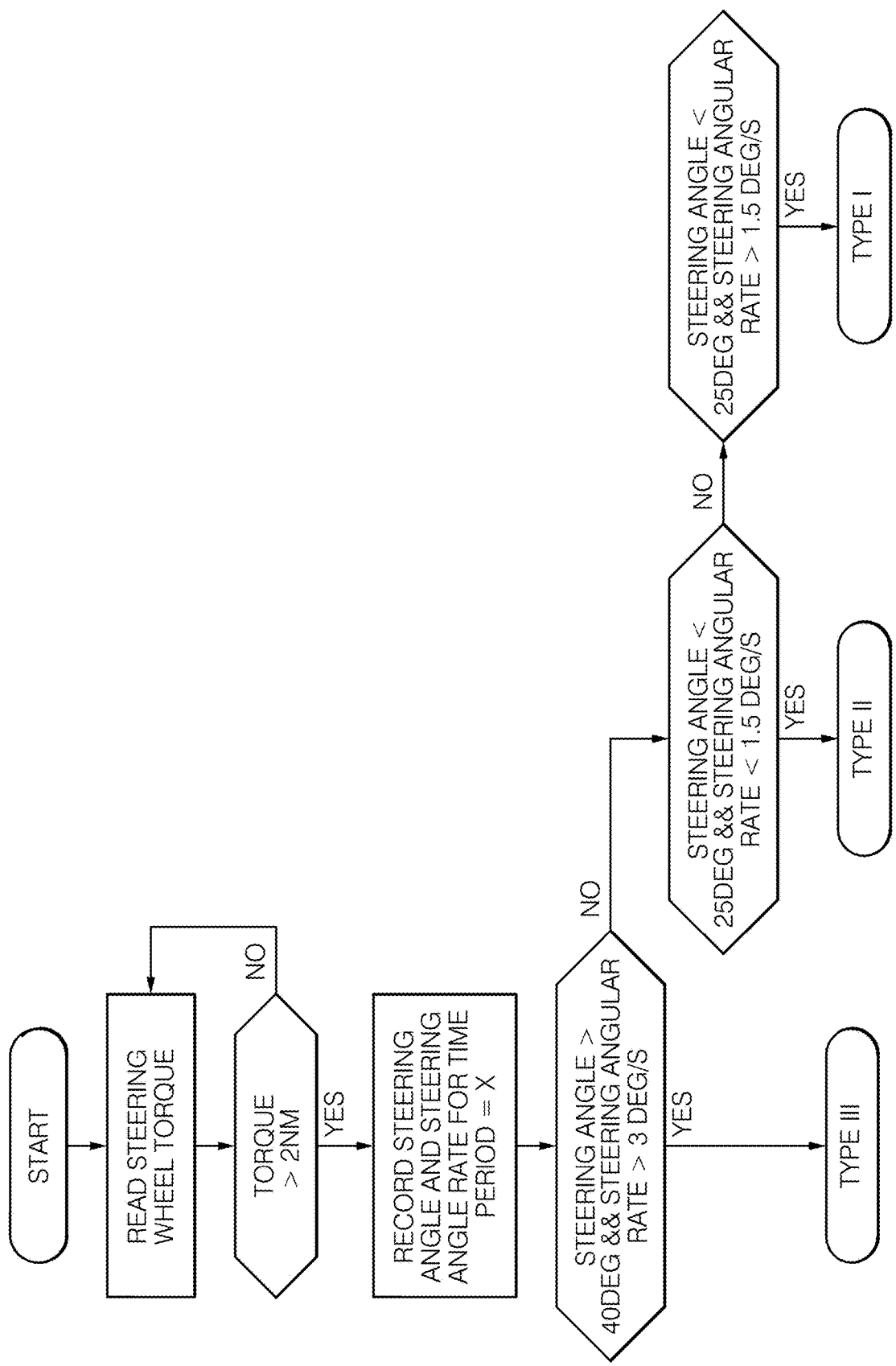
FIG. 7 is an illustration of a logic flow performed by the vehicle control system of FIG. 1 in accordance with one example.

In the example illustrated in FIGS. 5 and 6, the controller circuit 14 classifies a third take-over (i.e., Type III) that is indicated by relatively large steering angles 22 and relatively rapid steering angle rates 24, such as when the operator exerts a relatively hard persistent turn or rotation on the steering wheel. The Type III take-over may be indicative of the operator resuming control of the host vehicle 12 in emergency situations when a lane change may be required to avoid an obstacle is in the path of the host vehicle 12. In this example, the controller circuit 14 classifies the Type III take-over when the maximum steering angle 22 is greater than a fifth threshold (e.g., 40 degrees), and the maximum steering angle rate 24 is greater than the fourth threshold (e.g., 3 degrees/second). FIG. 7 illustrates an example of a logic flow performed by the controller circuit 14 to classify the take-over request as described in the above examples. The first, second, third, fourth, and fifth thresholds in the above examples may be determined by the user and may be calibrated based on the vehicle dynamics of the particular application.

In an example, the controller circuit 14 is further configured to determine a level of automated driver assistance based on the steering sensor 16, and based on the environment detected by the one or more perception sensors 18. The controller circuit 14 is configured to enable the automated driver assistance features during the transition from fully automated driving to manual driving to ensure a safe transition. In an example, the level of automated driver assistance includes: steering assistance applied for lane keeping and/or collision avoidance (e.g., evasive steering and/or emergency braking); limitations on a maximum steering angle 22 applied by the driver to inhibit vehicle instability; automated braking and speed control; and warnings for lane departure and/or collision. The automated driver assistance may be enabled for a time period or time threshold that may be predetermined (e.g., 5 seconds), or a dynamic time threshold that may be varied based on the environment and/or the host vehicle 12 operating conditions (e.g., host vehicle speed, road conditions, road geometry, detected obstructions, etc., or any combinations thereof).

Figure 8:
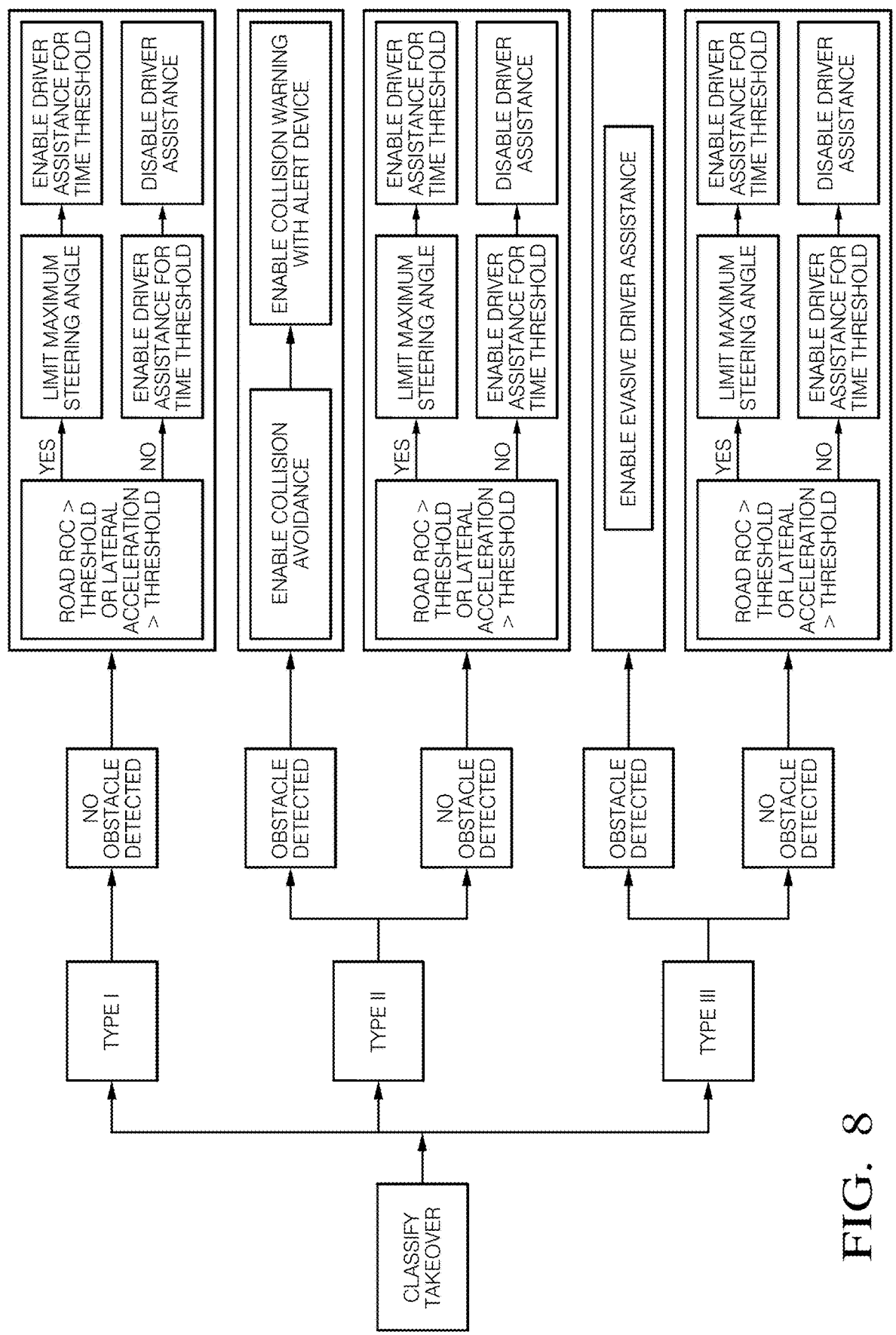
FIG. 8 is an illustration of another logic flow performed by the vehicle control system of FIG. 1 in accordance with one example.
Figure 9:
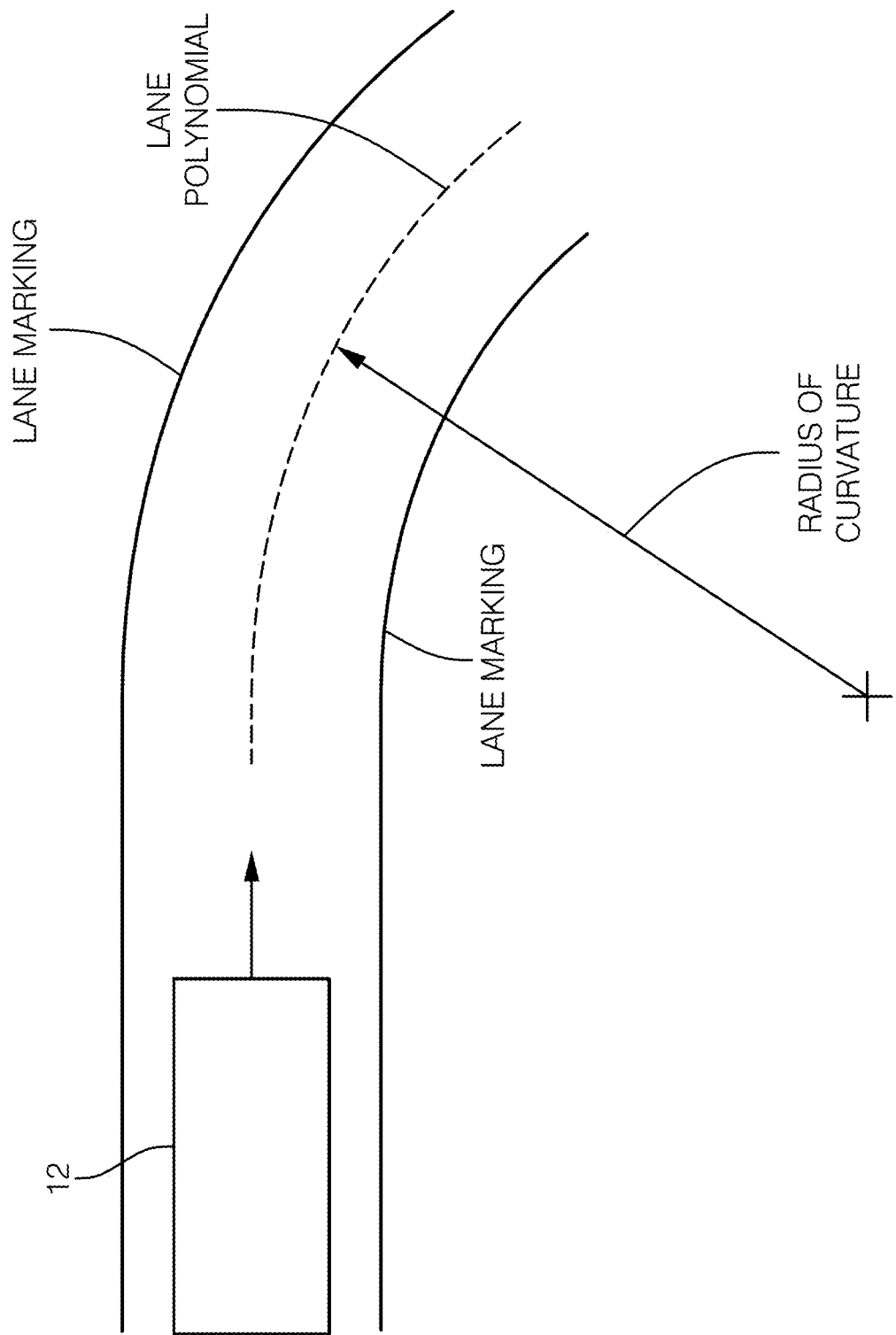
FIG. 9 is an illustration of a host vehicle equipped with the system of FIG. 1 traveling on a roadway in accordance with one example.

In an example, once the controller circuit 14 characterizes the take-over requests as described above, the controller circuit 14 then determines the level of automated driver assistance based on the take-over classification and the one or more perception sensors 18. FIG. 8 illustrates another example of a logic flow performed by the controller circuit 14 where the one or more perception sensors 18 are used to detect an obstacle and road conditions. In this example, when the controller circuit 14 classifies a first take-over (i.e., Type I) and no obstacle is detected by the one or more perception sensors 18, the controller circuit 14 further determines the level of automated driver assistance based on a radius of curvature (ROC) of the roadway exceeding a curvature threshold, and/or based on a lateral acceleration of the host vehicle 12 exceeding an acceleration threshold (e.g., greater than 5 m/s2). FIG. 9 illustrates the host vehicle 12 entering a curved section of the roadway. In an example, the controller circuit 14 is configured to determine the ROC of the roadway based on images of the roadway captured by the camera using known techniques for image analysis. The camera may detect lane markings and/or road edges that may be processed by the controller circuit 14 to determine a lane polynomial that corresponds to a center of the travel lane, from which the ROC may be determined. In an example, vision processing technologies, such as the EYE Q® platform from Moblieye Vision Technologies, Ltd. of Jerusalem, Israel, or other suitable devices may be used to determine the lane polynomial, and may be integrated with the controller circuit 14, or may be a separate package in communication with the controller circuit 14. The controller circuit 14 may use any of the known methods for determining the lane polynomial, including, but not limited to, a least squares method and an interpolation method. In some examples In another example, the controller circuit 14 is configured to determine the ROC based on a digital map that may be accessed by the host vehicle 12 from the memory of the controller circuit 14, or via a cloud-based service. In this example, the controller circuit 14 may determine a position of the host vehicle 12 relative to the curved section of the roadway via the GNSS receiver. In another example, the controller circuit 14 determines the lateral acceleration of the host vehicle 12 based on signals received from the IMU as the host vehicle 12 enters the curved section of the roadway where centrifugal forces act on the host vehicle 12.

In the example illustrated in FIG. 8, when the controller circuit 14 determines that the host vehicle 12 is traveling on the roadway with a ROC greater than the curvature threshold, or when the lateral acceleration of the host vehicle 12 measured by the IMU is greater than the acceleration threshold, the controller circuit 14 limits the maximum steering angle 22 that may be applied by the driver to maintain lateral stability of the host vehicle 12. That is, the controller circuit 14 limits the amount of steering angle 22 the driver may apply during the take-over transition so that the driver does not lose control of the host vehicle 12 by making excessive (and possibly unnecessary) steering maneuvers. The maximum steering angle threshold may vary based on a dynamic response of the host vehicle 12, and may be calculated based on a dynamic model of the host vehicle 12 using the current vehicle state parameters that include: the current steering angle 22, the current lateral acceleration, and the current vehicle yaw rate. It will be appreciated that other vehicle state parameters may be included in the calculation of the maximum steering angle threshold. In this example, when the ROC or lateral acceleration is less than the respective thresholds, the controller circuit 14 enables the necessary driver assistance (e.g., lane keeping assistance) for the time threshold, then disables the automated driver assistance after which the driver assumes complete control of the host vehicle 12.

Referring back to FIG. 8, upon characterizing the take-over request as a Type II take-over, the controller circuit 14 determines whether an obstacle is detected by the one or more perception sensors 18. When the obstacle is detected, the controller circuit 14 enables the necessary driver assistance to avoid a collision with the obstacle and enables a collision warning from an alert device alerting the driver to the potential collision. The alert device may be one or more of an audible device, a visual device, and a haptic device that alerts the driver to the potential collision. In this example, when no obstacle is detected, the controller circuit 14 determines whether the ROC of the roadway or the lateral acceleration is greater than their respective thresholds. When the ROC or the lateral acceleration is greater than the curvature threshold or the acceleration threshold, the controller circuit 14 limits the amount of steering angle 22 the driver may apply during the transition so that the driver does not lose control of the host vehicle 12. In this example, the controller circuit 14 then enables the necessary driver assistance (e.g., lane keeping assistance) for a period of time equal to the time threshold, after which the driver assumes complete control of the host vehicle 12.

Referring again to FIG. 8, upon characterizing the take-over request as a Type III take-over, the controller circuit 14 determines whether an obstacle is detected by the one or more perception sensors 18. When the obstacle is detected, the controller circuit 14 enables the evasive driver assistance to avoid the imminent threat of the collision with the obstacle. While not shown, the controller circuit 14 may also enable the collision warning from the alert device alerting the driver to the impending collision with the obstacle. In this example, when no obstacle is detected, the controller circuit 14 determines whether the ROC of the roadway or the lateral acceleration is greater than their respective thresholds. When the ROC or the lateral acceleration is greater than the curvature threshold or the acceleration threshold, the controller circuit 14 limits the amount of steering angle 22 the driver may apply during the transition so that the driver does not lose control of the host vehicle 12. In this example, the controller circuit 14 then enables the necessary driver assistance (e.g., lane keeping assistance) for a period of time equal to the time threshold, after which the driver assumes complete control of the host vehicle 12.

Figure 10:
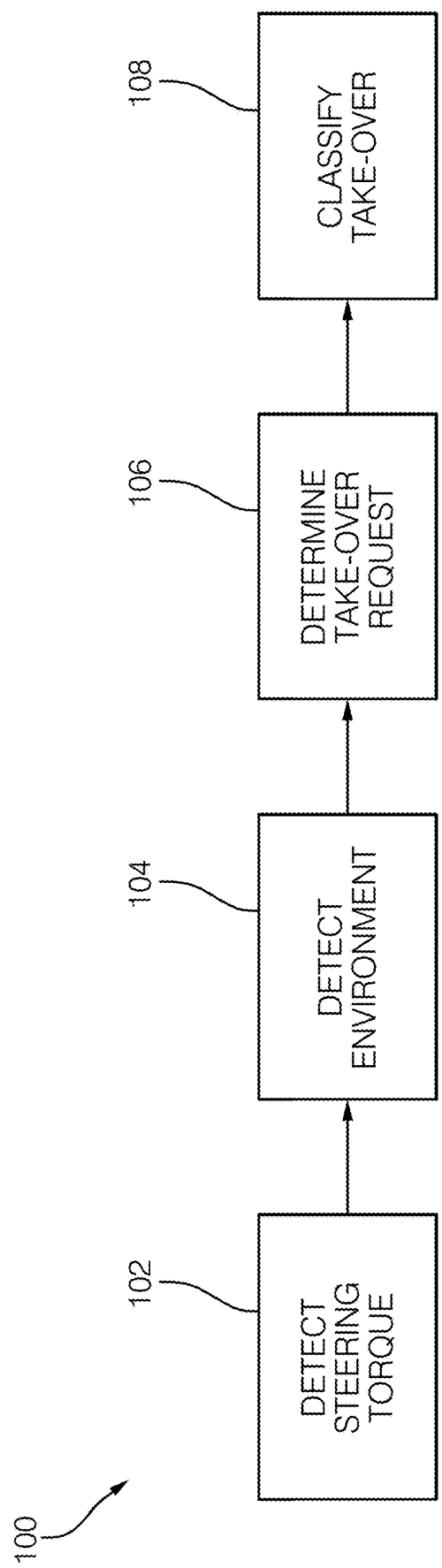
FIG. 10 is a flow chart of a method of operating the vehicle control system of FIG. 1 in accordance with one example.

FIG. 10 is a flow chart of a method 100 of operating the vehicle control system 10.

Step 102, DETECT STEERING TORQUE, includes detecting the steering torque 20 of the steering wheel of the host vehicle 12 with the steering sensor 16 as described above. The steering sensor 16 is configured to detect the steering torque 20, the steering angle 22, and the steering angle rate 24. The steering sensor 16 communicates with the controller circuit 14 via the host vehicle's 12 CAN bus. The steering sensor 16 may be a single device or multiple devices as described above.

Step 104, DETECT ENVIRONMENT, includes detecting the environment proximate the host vehicle 12 with one or more perception sensors 18. The one or more perception sensors 18 include ranging sensors, vision sensors, GNSS, and the IMU as described above. The one or more perception sensors 18 may be distributed around the host vehicle 12 and provide a 360 degree view of the environment in which the host vehicle 12 is operating.

Step 106, DETERMINE TAKE-OVER REQUEST, includes determining, with the controller circuit 14 in communication with the steering sensor 16 and the one or more perception sensors 18, when the operator of the host vehicle 12 requests the take-over based on the steering sensor 16. In an example, the steering sensor 16 detects when the operator places one or more hands on the steering wheel by measuring the change in the steering torque 20 and comparing the steering torque 20 to a first threshold. The controller circuit 14 determines that the operator requests the take-over when the steering torque 20 is greater than the first threshold, as described above.

Step 108, CLASSIFY TAKE-OVER, includes classifying, with the controller circuit 14, the take-over request based on the steering sensor 16. The controller circuit 14 classifies the taker-over as the first take-over request (Type I), the second take-over request (Type II), or the third take-over request (Type III), by comparing the steering angle 22 and steering angle rate 24 to their respective thresholds, as described above.

The controller circuit 14 further determines the level of automated driver assistance enabled during the transition from fully automated driving to manual driving to promote a safe transition. The level of automated driver assistance is based on the type of take-over request and whether obstacles are detected with the one or more perception sensors 18, as described above. The level of automated driver assistance includes steering assistance applied for lane keeping and/or collision avoidance, limitations on the maximum steering angle 22 applied by the driver to inhibit vehicle instability, automated braking and speed control, and warnings for lane departure and/or collision. The controller circuit 14 further determines the level of automated driver assistance based on the ROC of the roadway or based on the lateral acceleration of the host vehicle 12, as described above. When the ROC or the lateral acceleration is greater than the curvature threshold or the acceleration threshold, the controller circuit 14 limits the amount of steering angle 22 the driver may apply during the transition so that the driver does not lose control of the host vehicle 12. The controller circuit 14 then enables the necessary driver assistance for a period of time equal to the time threshold, after which the driver assumes complete control of the host vehicle 12.

Accordingly, a vehicle control system 10, and a method 100 of operating the vehicle control system 10 are provided. The vehicle control system 10 may provide advantages over other vehicle control systems because the system 10 enables a level of automated driver assistance during the transition from fully automated driving to manual driving.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A vehicle control system, comprising:
a controller circuit configured to:
receive, from a steering sensor, a steering torque of a steering wheel of a host vehicle;
receive, from one or more perception sensors, an environment proximate the host vehicle;
responsive to a determination that the steering torque meets a first threshold, determine that an operator of the host vehicle requests a take-over from fully automated control of the host vehicle;
responsive to the determination that the operator of the host vehicle requests the take-over from fully automated control of the host vehicle, classify, based on at least one of a steering angle and a steering angle rate or the environment proximate the host vehicle, the take-over as one of a plurality of take-over types;
determine, based on the take-over type for the take-over and on the environment proximate the host vehicle, a level of automated driver assistance of the host vehicle; and
operate the host vehicle according to the determined level of automated driver assistance.

2. The vehicle control system of claim 1, wherein the controller circuit is further configured to determine the level of automated driver assistance based on the steering sensor.

3. The vehicle control system of claim 1, wherein the one or more perception sensors include one or more of a camera, a RADAR, a LiDAR, and an inertial measurement unit.

4. The vehicle control system of claim 1, wherein the controller circuit is further configured to classify the take-over as a first take-over type when:
a maximum steering angle is less than a second threshold; and
a maximum steering angle rate is greater than a third threshold and less than a fourth threshold.

5. The vehicle control system of claim 4, wherein the controller circuit is further configured to classify the take-over as a second take-over type when:
a maximum steering angle is less than the second threshold; and
a maximum steering angle rate is less than the third threshold.

6. The vehicle control system of claim 5, wherein the controller circuit is further configured to classify the take-over as a third take-over type when:
a maximum steering angle is greater than a fifth threshold; and
a maximum steering angle rate is greater than the fourth threshold.

7. The vehicle control system of claim 1, wherein when the controller circuit is further configured to:
classify the take-over as a first take-over type when no obstacle is detected by the one or more perception sensors;
determine the level of automated driver assistance to be none; and
disable the automated driver assistance.

8. The vehicle control system of claim 7, wherein when the controller circuit is further configured to:
classify the take-over as a second take-over type when at least one obstacle is detected by the one or more perception sensors;
determine the level of automated driver assistance to be a level such that a collision with the at least one obstacle can be avoided; and
enable the automated driver assistance to avoid the collision with the at least one obstacle.

9. The vehicle control system of claim 8, wherein when the controller circuit is further configured to:
classify the take-over as a third take-over type when at least one obstacle is detected by the one or more perception sensors;
determine the level of automated driver assistance to be a level such that a collision with the at least one obstacle can be avoided; and
enable the automated driver assistance to avoid the collision with the at least one obstacle.

10. The vehicle control system of claim 1, wherein the controller circuit is further configured to determine the level of automated driver assistance based on a radius of curvature of a roadway.

11. The vehicle control system of claim 1, wherein when the controller circuit is further configured to determine the level of automated driver assistance based on a lateral acceleration of the host vehicle.

12. A method of operating a vehicle control system, the method comprising:
receiving, from a steering sensor, a steering torque of a steering wheel of a host vehicle;
receiving, from one or more perception sensors, an environment proximate the host vehicle;
responsive to determining that the steering torque meets a first threshold, determining that an operator of the host vehicle requests a take-over from fully automated control of the host vehicle based on the steering sensor;

responsive to determining that the operator of the host vehicle requests the take-over from fully automated control of the host vehicle, classifying, based on at least one of steering angle and steering angle rate or the environment proximate the host vehicle, the take-over as one of a plurality of take-over types;

determining, based on the take-over type for the take-over and on the environment proximate the host vehicle, a level of automated driver assistance of the host vehicle; and operating the host vehicle according to the determined level of automated driver assistance.

13. The method of claim 12, wherein the one or more perception sensors include one or more of a camera, a RADAR, a LiDAR, and an inertial measurement unit.

14. A non-transitory computer-readable storage medium comprising instructions that, when executed by a processor of a host vehicle, cause the processor to:

receive, from a steering sensor, a steering torque of a steering wheel of the host vehicle;

receive, from one or more perception sensors, an environment proximate the host vehicle;

responsive to a determination that the steering torque meets a first threshold, determine that an operator of the host vehicle requests a take-over from fully automated control of the host vehicle;

responsive to the determination that the operator of the host vehicle requests the take-over from fully automated control of the host vehicle, classify, based on at least one of steering angle and steering angle rate or the environment proximate the host vehicle, the take-over as one of a plurality of take-over types;

determine, based on the take-over type for the take-over and on the environment proximate the host vehicle, a level of automated driver assistance of the host vehicle; and operate the host vehicle according to the determined level of automated driver assistance.

15. The non-transitory computer-readable storage medium of claim 14, wherein the instructions further cause the processor to determine the level of automated driver assistance based on the steering sensor.

16. The non-transitory computer-readable storage medium of claim 14, wherein the one or more perception sensors include one or more of a camera, a RADAR, a LiDAR, and an inertial measurement unit.

17. The non-transitory computer-readable storage medium of claim 14, wherein the instructions further cause the processor to classify the take-over as a first take-over type when:

a maximum steering angle is less than a second threshold; and a maximum steering angle rate is greater than a third threshold and less than a fourth threshold.

18. The non-transitory computer-readable storage medium of claim 17, wherein the instructions further cause the processor to classify the take-over as a second take-over type when:

a maximum steering angle is less than the second threshold; and a maximum steering angle rate is less than the third threshold.

19. The non-transitory computer-readable storage medium of claim 18, wherein the instructions further cause the processor to classify the take-over as a third take-over type when:

a maximum steering angle is greater than a fifth threshold; and a maximum steering angle rate is greater than the fourth threshold.

20. The vehicle control system of claim 1, wherein the level of automated driver assistance comprises a level that limits a maximum steering angle applied by the driver.

21. The method of claim 12, wherein determining the level of automated driver assistance is based further on a radius of curvature of a roadway.

22. The method of claim 12, wherein determining the level of automated driver assistance is based further on a lateral acceleration of the host vehicle.

23. The method of claim 12, wherein the level of automated driver assistance comprises a level that limits a maximum steering angle applied by the driver.

24. The non-transitory computer-readable storage medium of claim 14, wherein the instructions further cause the processor to determine the level of automated driver assistance based on a radius of curvature of a roadway.

25. The non-transitory computer-readable storage medium of claim 14, wherein the instructions further cause the processor to determine the level of automated driver assistance based on a lateral acceleration of the host vehicle.

* * * * *